United States Patent
Heywood et al.

(10) Patent No.: US 7,290,522 B2
(45) Date of Patent: Nov. 6, 2007

(54) HIGH COMPRESSION RATIO, HIGH POWER DENSITY HOMOGENEOUS CHARGE COMPRESSION IGNITION ENGINES USING HYDROGEN AND CARBON MONOXIDE TO ENHANCE AUTO-IGNITION RESISTANCE

(75) Inventors: John Heywood, Newton, MA (US); Leslie Bromberg, Sharon, MA (US); Daniel Cohn, Chestnut Hill, MA (US)

(73) Assignee: Masschusetts Institute of Technology, Cambridge, MA (US)

( * ) Notice: Subject to any disclaimer, the term of this patent is extended or adjusted under 35 U.S.C. 154(b) by 0 days.

(21) Appl. No.: 10/755,541

(22) Filed: Jan. 12, 2004

(65) Prior Publication Data

US 2004/0250790 A1 Dec. 16, 2004

Related U.S. Application Data

(63) Continuation-in-part of application No. 10/460,574, filed on Jun. 12, 2003.

(51) Int. Cl.
*F02B 3/00* (2006.01)

(52) U.S. Cl. .......... 123/300; 60/602; 123/295; 123/27 R

(58) Field of Classification Search .......... 123/300, 123/304, 305, 295, 3, 525, 526, 559.1, 536, 123/537, 538, 27 R, 27 GE, 299, 575; 60/602
See application file for complete search history.

(56) References Cited

U.S. PATENT DOCUMENTS

| | | | |
|---|---|---|---|
| 3,918,412 A | 11/1975 | Lindstrom et al. | |
| 6,092,512 A | 7/2000 | Ma et al. | |
| 6,286,482 B1 | 9/2001 | Flynn et al. | |
| 6,561,157 B2 * | 5/2003 | zur Loye et al. | 123/295 |
| 6,651,432 B1 * | 11/2003 | Gray, Jr. | 60/605.2 |
| 6,684,849 B2 * | 2/2004 | zur Loye et al. | 123/295 |
| 6,866,016 B2 * | 3/2005 | Cueman | 123/299 |
| 6,981,472 B2 * | 1/2006 | Bromberg et al. | 123/3 |
| 2003/0047147 A1 * | 3/2003 | Daniel et al. | 123/3 |

FOREIGN PATENT DOCUMENTS

EP  1 378 644  1/2004

OTHER PUBLICATIONS

International Search Report dated Nov. 4, 2005, for PCT/US2004/044053 filed Dec. 31, 2004.

* cited by examiner

*Primary Examiner*—Stephen K. Cronin
*Assistant Examiner*—Katrina Harris
(74) *Attorney, Agent, or Firm*—Sam Pasternack; Choate Hall & Stewart LLP

(57) ABSTRACT

High compression ratio, homogeneous charge compression ignition engines. In one aspect the engine is dual mode utilizing spark ignition at high load levels including the addition of hydrogen or a hydrogen/carbon monoxide mixture. In another aspect, the engine operates on a high cetane fuel with the addition of hydrogen or a hydrogen/carbon monoxide mixture at low-to-mid-load levels.

21 Claims, 2 Drawing Sheets

Low to medium loads  Heavy loads

HIGH COMPRESSION RATIO, HIGH POWER DENSITY HOMOGENEOUS CHARGE COMPRESSION IGNITION ENGINES USING HYDROGEN AND CARBON MONOXIDE TO ENHANCE AUTO-IGNITION RESISTANCE

This application is a continuation in part of pending U.S. patent application Ser. No. 10/460,574 filed Jun. 12, 2003 and entitled "Hydrogen and Carbon Monoxide Enhanced Knock Resistance in Spark Ignition Gasoline Engines".

BACKGROUND OF THE INVENTION

Homogeneous charge compression ignition (HCCI) is a new engine combustion concept that offers a means to increase the efficiency of gasoline and diesel fueled engines. For gasoline engines, the use of HCCI combustion rather than spark ignition combustion can enable well-mixed, very lean fuel-air mixtures to be burned rapidly inside the engine cylinder at high engine compression ratio. These conditions give high engine efficiency and exceptionally low $NO_x$, CO, and particulate emissions. However, it is extremely difficult in a practical engine concept to make gasoline HCCI combustion work satisfactorily at all loads, and in particular, at high engine loads. Load is used to denote relative torque: the ratio of actual torque to maximum torque at a given engine speed. Low load is up to about one-third maximum torque; high load is above about two-thirds maximum torque. Practical gasoline engine concepts that use the HCCI combustion mode utilize it between low- and mid-load levels, and return to the normal spark-ignition combustion mode at high loads. Such combined engine concepts thus have a severe knock problem to overcome in the high-load spark-ignition engine operating mode if the high compression ratio (up to about 15:1) desirable for the HCCI mode is used. If the compression ratio is reduced to normal values (around 10:1) to avoid this knock problem, much of the part-load HCCI efficiency benefit is lost. In addition, the onset of knock at high loads also limits the use of pressure boosting such as through turbocharging and supercharging to increase engine power density and decrease engine size.

HCCI engines can also operate on diesel fuel. High cetane diesel fuels provide the desired diesel-like performance at high loads. At low and mid-load levels, however, since the high cetane fuel is readily ignited, there is not enough time for fuel-air mixing following injection during the compression stroke to produce the desired homogeneous charge. Too rapid auto ignition at low- and mid-load levels degrades engine operation in the HCCI combustion mode. It is therefore desirable to enhance autoignition resistance at low-to mid-load levels.

Co-owned pending U.S. patent application Ser. No. 10/460,574, the contents of which are incorporated herein by reference, discloses the use of hydrogen, and hydrogen and carbon monoxide mixtures to enhance knock resistance to improve the performance of spark-ignition gasoline engines. The enhanced knock resistance is a manifestation of the increased resistance to autoignition, the self-ignition of a fuel air mixture under sufficient temperature and pressure. In particular, the pending application demonstrated that modest amounts of hydrogen addition to a gasoline vapor/air mixture within an engine cylinder can raise the fuel's octane number by ten or more numbers. When carbon monoxide is mixed with the hydrogen, with roughly equal energy content in each of these added gases, the impact can be approximately doubled (for the same hydrogen energy content). The present invention builds on the use of hydrogen and/or hydrogen and carbon monoxide mixtures to improve performance in homogeneous charge compression ignition engines.

SUMMARY OF THE INVENTION

In one aspect, the invention is a high compression ratio, homogeneous charge compression ignition/spark ignition dual mode gasoline (or other low octane hydrocarbon) fuel engine. The engine has a first mode employing homogenous charge compression ignition at low- and mid-load levels and a second mode employing spark ignition at high-load levels. The second mode includes the addition of hydrogen or a hydrogen/carbon monoxide mixture in the engine. In a preferred embodiment the compression ratio is greater than about 10:1 and up to about 15:1. It is preferred that a control system be provided to change engine modes. It is also preferred that the engine operates on a very lean fuel-air mixture where at some time in the drive cycle the amount of air is 50% or more than is needed for stoichiometric combustion. The addition of hydrogen and/or a hydrogen/carbon monoxide mixture will also permit pressure boosting such as by turbocharging or supercharging. Alternatively, the engine could operate with a stoichiometric mixture in which the fuel-air mixture is substantially diluted with recycled exhaust (EGR).

The hydrogen or hydrogen/carbon monoxide mixture may be produced onboard by a hydrocarbon fuel reformer such as a plasmatron reformer or it may be stored in a high pressure vessel or other means of onboard storage such as hydrides or liquid hydrogen. It is also preferred that the amount of the hydrogen or hydrogen/carbon monoxide mixture added to the hydrocarbon-air mixture be increased as engine load increases. In one embodiment the combustion rate can be controlled and varied by stratifying the hydrogen or the hydrogen/carbon monoxide mixture. Such stratifying may be achieved through non-uniform port fueling or by in-cylinder injection of the hydrogen rich gas. In another embodiment means are provided for slowing down the combustion process to reduce acoustic noise.

In another aspect, the invention is a high compression ratio, homogeneous charge compression ignition engine operating on diesel fuel (or other high cetane fuel) comprising the addition of hydrogen or a hydrogen/carbon monoxide mixture at low- to mid-load levels. It is also contemplated to add a reduced amount of hydrogen or a hydrogen/carbon monoxide mixture at high load levels. The ratio of hydrogen or a hydrogen/carbon monoxide mixture to the fuel is varied to achieve a selected ignition delay. Pressure boosting may be used to increase engine power. The hydrogen or hydrogen/carbon monoxide mixture may be produced by a hydrocarbon fuel reformer such as a plasmatron or it may be stored onboard in a high pressure vessel.

DESCRIPTION OF THE PREFERRED EMBODIMENT

Figures 1A, 1B:
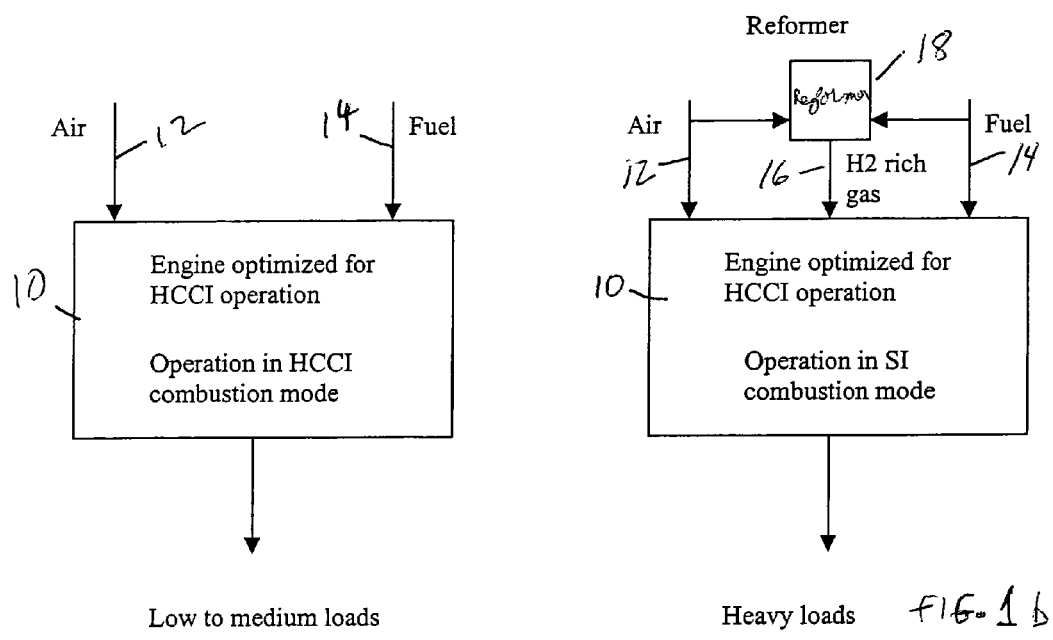
FIG. 1a is a block diagram of an HCCI gasoline engine operated at low to medium loads.
FIG. 1b is a block diagram of an HCCI gasoline engine operated at heavy loads and including addition of a hydrogen rich gas.

As discussed above, it is extremely difficult in a practical engine to make gasoline HCCI combustion work satisfactorily at all loads and, in particular, at high engine loads. With reference to FIG. 1a a high compression engine 10 operating in HCCI combustion mode at low to medium loads operates on air 12 and fuel 14. As shown in FIG. 1b the engine 10 is operated at heavy loads in a spark-ignition combustion mode and a severe knock problem is avoided by adding a hydrogen-rich gas 16 in addition to air 12 and the fuel 14. The hydrogen-rich gas 16 may come from a reformer 18 such as a plasmatron reformer.

The engine 10 is therefore a dual mode engine and a control system (not shown) is provided to switch from the mode of FIG. 1a to the mode of FIG. 1b that includes the introduction of the hydrogen-rich gas. The addition of hydrogen or a hydrogen/carbon monoxide mixture enhances the octane rating and hence the knock resistance of the fuel under high load, high compression ratio and possibly highly boosted operating conditions. It is contemplated that an HCCI engine using hydrogen enhanced knock resistance will operate in the following way. Under HCCI combustion operation, a low octane rating gasoline or other hydrocarbon fuel is attractive since, with HCCI, easier autoignition at lower after-compression fuel-air mixture temperatures within the cylinder is desirable. Such autoignition characteristics go with lower octane rating fuels. Then, outside the HCCI combustion regime where normal spark-ignition combustion is used (FIG. 1b), the potential knock problem resulting from the engine's high compression ratio is avoided by adding sufficient $H_2$ (or $H_2+CO$) to just suppress the knock. The amount of $H_2$ (or $H_2+CO$) added would be increased as engine load is increased above the HCCI/normal spark-ignition combustion boundary.

In light-duty vehicle operation, most of the driving is done with the engine lightly loaded so that the amount of $H_2$ required over the driving cycle to avoid knock at high load conditions is not excessive. The hydrogen may be stored in a small high pressure tank that can be refueled when the vehicle's gasoline tank is refueled. Alternatively, the hydrogen, with accompanying CO, may be produced in a reformer from gasoline or other hydrocarbon fuel. A variety of reformers may be used including plasmatron reformers. In certain situations, some amount of hydrogen and/or carbon monoxide may also be used in the engine at low- to mid-loads. For example, it may be desirable to operate an on-board reformer at some level throughout the drive cycle in order to improve rapid response capability by improving transition between the two combustion modes. Such a transition might occur from low torque to high torque during strong acceleration.

It is also contemplated to vary the combustion rate by stratifying the hydrogen, or the hydrogen and carbon monoxide mixture, to extend the HCCI operating range, or to reduce noise by slowing down the fastest part of the combustion process. Stratification is the use of inhomogeneous air/fuel mixtures, with a non-uniform distribution of the hydrogen or the hydrogen and carbon monoxide mixtures in the cylinder. The non-uniform distribution can be achieved through non-uniform or time-varying port fueling or more likely by in-cylinder injection of hydrogen-rich gas.

The HCCI-spark ignition engine shown in FIGS. 1a and 1b is thus attractive in that it uses HCCI where this mode is feasible and advantageous, uses spark-ignition engine combustion at higher loads where HCCI is not feasible, uses a high compression ratio in all operating modes, permits pressure boosting by turbocharging or supercharging or other means to increase the engine's output and requires only a modest fraction of its energy to be in the form of hydrogen over normal vehicle driving cycles. The engine disclosed herein is thus optimized to take advantage of the benefits of HCCI operation at low- and mid-loads without being constrained by previous limits on high load performance.

Figures 2A, 2B:
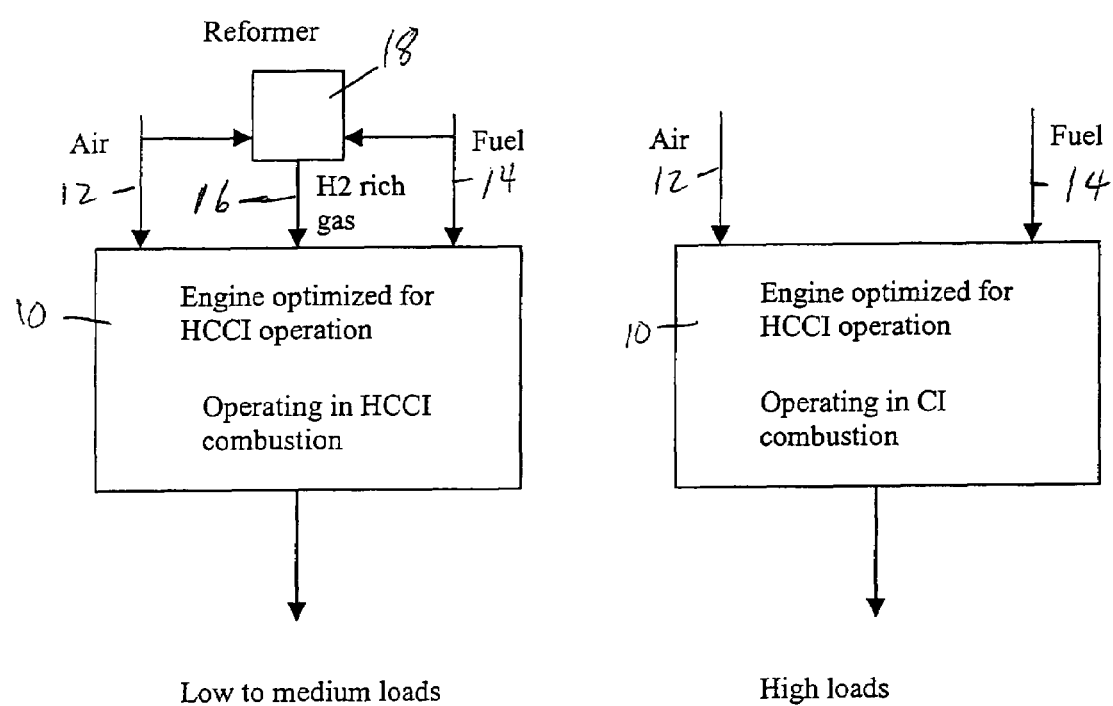
FIG. 2a is a block diagram of a compression ignition (diesel) engine operated at low to medium loads and including the addition of hydrogen rich gas.
FIG. 2b is a block diagram of a compression ignition engine operating at high loads.

With reference now to FIGS. 2a and 2b, hydrogen or a hydrogen and carbon monoxide mixture is used to improve the operation of HCCI engines operating on diesel or other high cetane fuel by slowing down the compression ignition process which takes place at low- to mid-level loads. As shown in FIG. 2a, hydrogen-rich gas 16 is added to the engine. The hydrogen-rich gas addition gives more time for fuel-air mixing following injection during the compression stroke thereby producing a more homogeneous charge.

At high loads, the hydrogen and carbon monoxide 16 addition may be reduced or eliminated as shown in FIG. 2b thereby allowing the required fast compression ignition with fuels like diesel which have fast autoignition characteristics.

By using hydrogen addition one can use a high cetane diesel fuel with HCCI-like combustion because hydrogen addition makes compression ignition more difficult.

Except for the present invention, a low cetane diesel fuel would have been necessary at low to medium loads but low cetane fuel will not provide the desired diesel-like performance at high loads. The use of hydrogen or carbon monoxide enhanced autoignition resistance at low- to mid-load levels allows high cetane fuel to be used at high loads while providing low cetane-like characteristics and good mixing at low- to mid-levels. This use of low cetane diesel fuel has been discussed in SAE Paper 2003-01-0742, the contents of which are incorporated herein by reference.

The addition of hydrogen or hydrogen and carbon monoxide mixtures such as from a fuel reformer would be terminated or the ratio to high cetane fuel reduced to a sufficiently low level after the diesel engine load has increased to a sufficiently high level. It may be necessary always to keep the fuel reformer operating at some level rather than to turn it off completely as was the case with the gasoline engine discussed above. The ratio of hydrogen, carbon monoxide or hydrogen and carbon monoxide to diesel or another hydrocarbon fuel can be varied so as to obtain a desired ignition delay and to minimize the amount of hydrogen, or hydrogen and carbon monoxide mixtures, that is used. Those skilled in the art will appreciate that the engine illustrated in FIGS. 2a and 2b can use other hydrocarbon fuels including bio-diesel fuel.

It is recognized that modifications and variations of the present invention will occur to those skilled in the art and it is intended that all such modifications and variations be included within the scope of the appended claims.

What is claimed is:

1. High compression ratio, homogeneous charge compression ignition/spark ignition dual mode engine comprising:
    a first mode employing homogeneous charge compression ignition at low- and mid-load levels; and
    a second mode employing spark ignition at high load levels, the second mode including the addition of hydrogen or a hydrogen/carbon monoxide mixture in the engine.

2. The engine of claim 1 wherein the compression ratio is greater than about 10:1.

3. The engine of claim 1 operating on a low octane gasoline.

4. The engine of claim 1 wherein the addition of hydrogen or a hydrogen/carbon monoxide mixture is sufficient to prevent knock.

5. The engine of claim 1 wherein the addition of hydrogen or a hydrogen/carbon monoxide mixture increases the fuel octane number by at least 10.

6. The engine of claim 1 further including control means for changing engine mode.

7. The engine of claim 1 wherein the engine operates on a very lean fuel-air mixture or at a stoichiometric fuel-air mixture with high EGR.

8. The engine of claim 1 further including pressure boosting to increase engine power density.

9. The engine of claim 8 wherein pressure boosting is by turbocharging or supercharging.

10. The engine of claim 1 wherein the hydrogen or hydrogen/carbon monoxide mixture is produced by a hydrocarbon fuel reformer.

11. The engine of claim 10 wherein the fuel reformer is a plasmatron reformer.

12. The engine of claim 1 wherein the hydrogen is stored in a high pressure vessel or other onboard storage means.

13. The engine of claim 12 wherein the power boosting is by turbocharging or supercharging.

14. The engine of claim 1 further including means for varying combustion rate by stratifying the hydrogen or the hydrogen/carbon monoxide mixture.

15. The engine of claim 14 wherein stratifying the hydrogen or hydrogen/carbon monoxide mixture is achieved through non-uniform or time-varying port fueling or by in-cylinder injection.

16. The engine of claim 1 further including means for slowing down the combustion process to reduce acoustic noise.

17. The engine of claim 1 wherein the amount of the hydrogen or the hydrogen/carbon monoxide mixture is increased as engine load increases.

18. High compression ratio, homogeneous charge compression ignition engine operating on a high cetane fuel along with the addition of hydrogen or a hydrogen/carbon monoxide mixture at low-to-mid-load levels, wherein hydrogen or hydrogen-carbon monoxide mixture is produced by a hydrocarbon fuel reformer.

19. The engine of claim 18 wherein the fuel reformer is a plasmatron.

20. High compression ratio, homogeneous charge compression ignition engine operating on a high cetane fuel along with the addition of hydrogen or a hydrogen/carbon monoxide mixture at low-to-mid-load levels, wherein the hydrogen or hydrogen/carbon monoxide mixture is contained in a high pressure vessel or other onboard storage means.

21. High compression ratio, homogeneous charge compression ignition engine operating on a high cetane fuel along with the addition of hydrogen or a hydrogen/carbon monoxide mixture at low-to-mid-load levels, wherein the high cetane fuel is bio-oil.

* * * * *